(12) United States Patent
Ogata (10) Patent No.: US 9,470,389 B2
(45) Date of Patent: Oct. 18, 2016

(54) LIGHTING DEVICE, LIGHTING FITTING, AND VEHICLE

(71) Applicant: Panasonic Corporation, Osaka (JP)

(72) Inventor: Tomoyuki Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 133 days.

(21) Appl. No.: 14/314,197

(22) Filed: Jun. 25, 2014

(65) Prior Publication Data

US 2015/0009696 A1    Jan. 8, 2015

(30) Foreign Application Priority Data

Jul. 3, 2013   (JP) .................................. 2013-139490

(51) Int. Cl.
  *F21V 5/00*    (2015.01)
  *F21S 8/10*    (2006.01)
  *G02B 6/00*    (2006.01)
  *F21V 8/00*    (2006.01)

(52) U.S. Cl.
  CPC ........ *F21S 48/2237* (2013.01); *F21S 48/2268* (2013.01); *F21S 48/2287* (2013.01); *G02B 6/001* (2013.01); *F21S 48/215* (2013.01); *G02B 6/0036* (2013.01)

(58) Field of Classification Search
  CPC ............. F21S 48/2237; F21S 48/2268; F21S 48/2287; F21S 48/215; G02B 6/0036
  USPC .......................................................... 362/511
  See application file for complete search history.

(56) References Cited

U.S. PATENT DOCUMENTS 5,432,876 A * 7/1995 Appeldorn ............ G02B 6/001
                                                       362/554
2010/0254152 A1* 10/2010 Taleb-Bendiab ..... B60Q 1/0035
                                                       362/551

FOREIGN PATENT DOCUMENTS

JP        2012-119277        6/2012

* cited by examiner

*Primary Examiner* — Andrew Coughlin
*Assistant Examiner* — Nathaniel Lee
(74) *Attorney, Agent, or Firm* — Renner, Otto, Boisselle & Sklar, LLP (57) ABSTRACT

A lighting device including: a light guide which is elongated and has a first end portion with an entrance surface; and a light source provided facing the entrance surface of the light guide, wherein the light guide includes: a reflective surface between the first end portion and a second end portion of the light guide; and an exit surface opposite the reflective surface, the reflective surface includes a plurality of grooves which extend in a direction oblique to a direction perpendicular to an extending direction of the light guide in a first region between the first end portion and the second end portion, and the exit surface includes a concave portion which extends from the first end portion toward the second end portion.

7 Claims, 11 Drawing Sheets

LIGHTING DEVICE, LIGHTING FITTING, AND VEHICLE

CROSS REFERENCE TO RELATED APPLICATION

This application claims the benefit of priority of Japanese Patent Application No. 2013-139490, filed Jul. 3, 2013, the entire content of which is hereby incorporated by reference.

TECHNICAL FIELD

The present disclosure relates to lighting devices, lighting fittings, and vehicles.

BACKGROUND ART

Figure 14A:
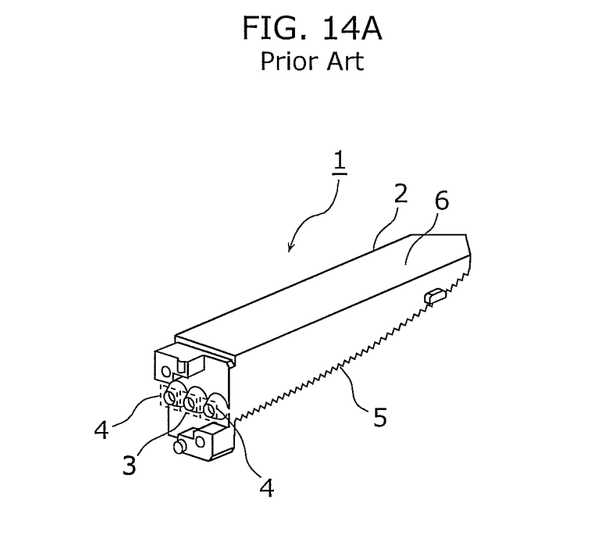
FIG. 14A is a perspective view of a conventional lighting device.
Figure 14B:
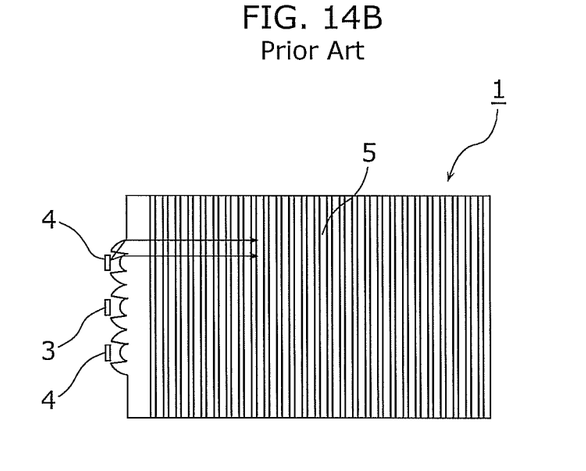
FIG. 14B is a rear view of the conventional lighting device.

FIG. 14A illustrates a perspective view of a conventional lighting device, and FIG. 14B illustrates a rear view of this lighting device.

As illustrated in FIG. 14A and FIG. 14B, a conventional light device 1 is a vehicle optical unit and includes: a light guide lens (light guide) 2; a white LED light source 3 which radiates white light that enters the light guide lens 2 and then exits to form luminous intensity distribution of a daytime running lamp; and an orange LED light source 4 which radiates orange light that enters the light guide lens 2 and then exits to form luminous intensity distribution of a front turn lamp (for example, Japanese Unexamined Patent Application Publication No. 2012-119277). The light guide lens 2 includes, in a rear surface thereof, a plurality of individual total-reflective surfaces 5. The individual total-reflective surfaces 5 are arranged so that a surface 6 of the light guide lens 2 has uniform luminance when viewed from a particular view point in front of the surface 6 of the light guide lens 2 (for example, right in front of the surface 6 of the light guide lens 2).

SUMMARY

However, the conventional lighting device 1 has a structure the goal of which is only to provide necessary luminous intensity distribution of each of the daytime running lamp and the front turn lamp and merely includes a function of illumination.

On the other hand, in the case of a lighting device used especially in a vehicle, the lighting device has a significant impact on the design of the whole vehicle; therefore, the importance of decorativeness of the lighting device is expected to grow.

Thus, a lighting device, a lighting fitting, and a vehicle according to an aspect of the present invention have a goal to provide both a function of illumination and a function of decoration.

In order to achieve the above-described goal, a lighting device according to one aspect of the present invention includes: a light guide which is elongated and has a first end portion with an entrance surface; and a light source provided facing the entrance surface of the light guide, wherein the light guide includes: a reflective surface between the first end portion and a second end portion of the light guide; and an exit surface opposite the reflective surface, the reflective surface includes a plurality of grooves which extend in a direction oblique to a direction perpendicular to an extending direction of the light guide in a first region between the first end portion and the second end portion, and the exit surface includes a concave portion which extends from the first end portion toward the second end portion.

Furthermore, in the lighting device according to one aspect of the present invention, the light guide may be curved between the first end portion and the second end portion.

Furthermore, in the lighting device according to one aspect of the present invention, the light guide may be curved between the first end portion and the second end portion in a direction parallel to the reflective surface.

Furthermore, in the lighting device according to one aspect of the present invention, it may be that the light guide includes: the first region; and a second region near the second end portion relative to the first region, and the plurality of grooves are provided extending in a direction perpendicular to an extending direction of the light guide in the second region.

Furthermore, in the lighting device according to one aspect of the present invention, the plurality of grooves may have a smaller pitch near the second end portion than near the first end portion.

Furthermore, a lighting fitting according to one aspect of the present invention includes: the lighting device according to one aspect; and a housing in which the lighting device is placed.

Furthermore, a vehicle according to one aspect of the present invention includes: the lighting device according to one aspect; and a vehicle body.

With the lighting device, the lighting fitting, and the vehicle according to an aspect of the present invention, it is possible to provide both the function of illumination and the function of decoration.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, exemplary embodiments of the present invention are described with reference to the Drawings. Each of the subsequently-described embodiments shows one specific preferred example of the present invention. The numerical values, shapes, materials, structural components, the arrangement and connection of the structural components, etc. shown in the following exemplary embodiments are mere examples, and are not intended to limit the scope of the present invention. As such, among the structural components in the following exemplary embodiments, components not recited in any one of the independent claims which indicate the broadest concepts of the present invention are described as arbitrary structural components.

It should be noted that the respective figures are schematic diagrams and are not necessarily precise illustrations. Additionally, components that are essentially the same share the same reference numerals in the respective figures, and overlapping explanations thereof are omitted or simplified.

Embodiment 1

Figure 1:
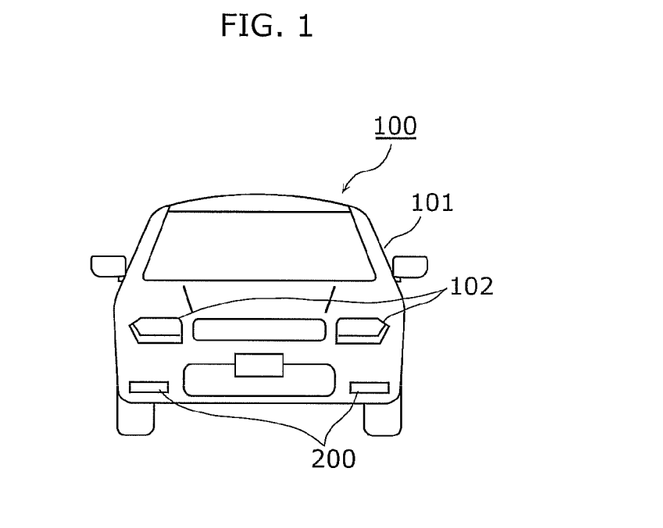
FIG. 1 is a front view of a vehicle according to one example of the present invention.

FIG. 1 is a front view of a vehicle according to one example of the present invention. As illustrated in FIG. 1, a vehicle 100 according to Embodiment 1 of the present invention includes a vehicle body 101 and a lighting fitting 200 which is a subject matter of Embodiment 1 of the present invention.

In the following descriptions including other embodiments, a direction of travel of the vehicle 100 that moves forward is referred to as "front" or "forward", a direction opposite thereto (an opposite side) is referred to as "rear" or "rearward," a direction to the right (right side) of the vehicle 100 that moves forward is referred to as "right" or "rightward", a direction opposite thereto (an opposite side) is referred to as "left" or "leftward," a direction to the ceiling of the vehicle 100 is "above" or "upper", and a direction opposite thereto (an opposite side) is referred to as "below" or "lower."

The vehicle 100 is, for example, a four-wheeled vehicle such as a gasoline car which is powered by a gasoline engine or an electric car which is powered by electricity. The vehicle body 101 is a body which forms the outer shape of the vehicle 100.

The lighting fitting 200 includes a housing (not illustrated) and a lighting device 300 placed in the housing which is a subject matter of Embodiment 1 of the present invention. In other words, the lighting device 300 is placed in the housing of the lighting fitting 200.

The lighting fitting 200 is, for example, a daytime running light (DRL). The lighting fitting 200 in this embodiment is provided below each of front lamp units 102 laterally arranged one on the left and one on the right in a front part of the vehicle body 101 as illustrated in FIG. 1, but the lighting fitting 200 may be provided in another part.

The housing is, for example, a metallic casing having an opening portion (not illustrated) from which light from the lighting device 300 exits. Here, the opening portion may be covered with a lens or the like.

Figure 2:
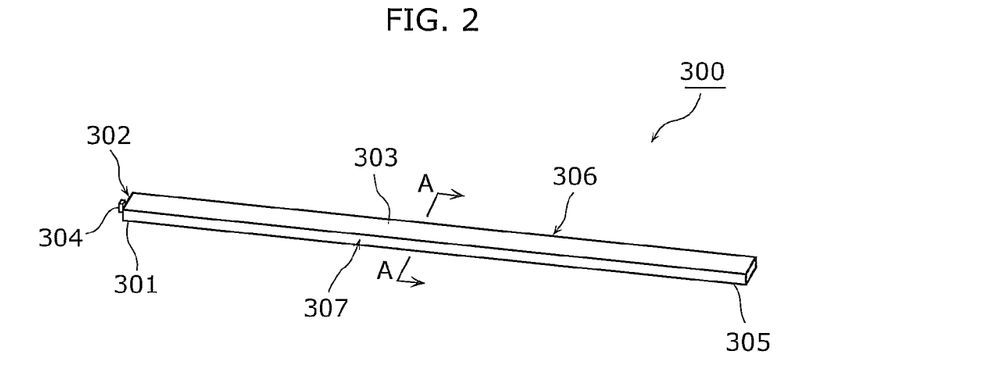
FIG. 2 is a perspective view of a lighting device according to one example of the present invention.

FIG. 2 illustrates a perspective view of the lighting device 300. As illustrated in FIG. 2, the lighting device 300 includes: a light guide 303 which is elongated and has a first end portion 301 with an entrance surface 302; and a light source 304 provided facing the entrance surface 302 of the light guide 303.

The light source 304 is, for example, a light-emitting element such as a light-emitting diode. In the case of using the light-emitting diode, the light source 304 may use a chip-on-board (COB) light source module having an LED chip or chips mounted on a substrate. Alternatively, the light source 304 may use a light source module in which a surface-mount-device (SMD) element having an LED chip or chips mounted on a package substrate is mounted on a substrate. Furthermore, as an example, the light source 304 is a white light source which may be, for example, that emits white light using a blue LED chip which emits blue light and a wavelength converter such as an yellow phosphor or that emits white light using LED chips which emit blue light, red light, and green light, respectively.

The light guide 303 extends linearly, having the form of a flat plate. It is to be noted that the light guide 303 is not limited to the form of a flat plate and may have the form of a bar which is polygonal or circular in cross section as taken along a direction that is perpendicular to an extending direction thereof. The light guide 303 is made of acrylic resin or polycarbonate resin, for example, and can be produced by injection molding or the like.

The light guide 303 includes: a reflective surface 306 between the first end portion 301 and a second end portion 305; and an exit surface 307 opposite the reflective surface 306.

Figure 3:
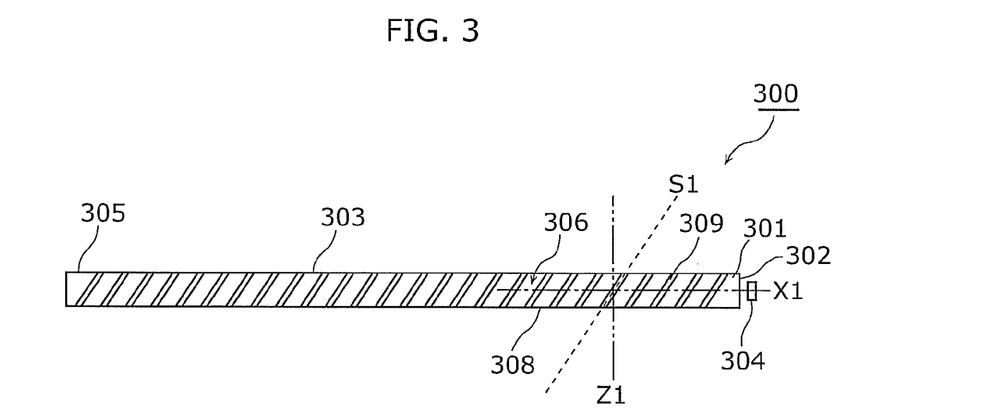
FIG. 3 is a rear view of the lighting device according to one example of the present invention.
Figure 4:
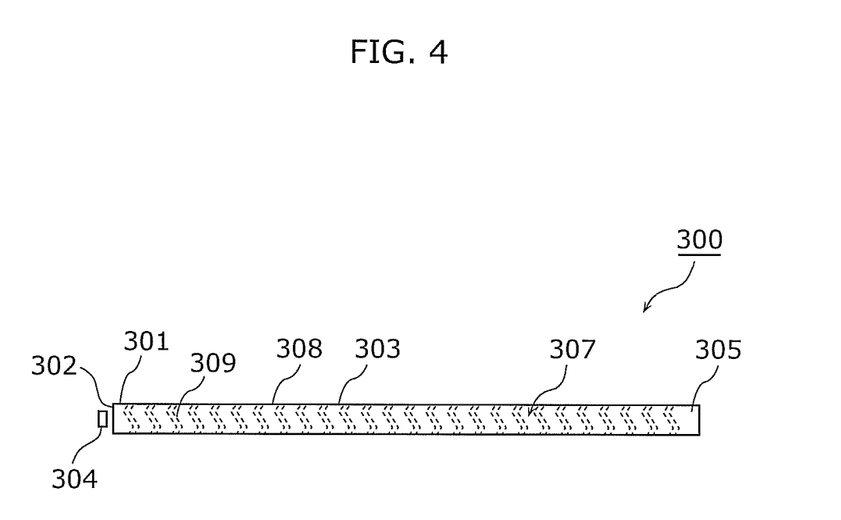
FIG. 4 is a front view of the lighting device according to one example of the present invention.

FIG. 3 illustrates a rear view of the lighting device 300, and FIG. 4 illustrates a front view of the lighting device 300. The lighting device 300 in FIG. 3 is viewed from the reflective surface 306 side, and the lighting device 300 in FIG. 4 is viewed from the exit surface 307 side.

As illustrated in FIG. 3, the reflective surface 306 in a first region 308 between the first end portion 301 and the second end portion 305 includes a plurality of grooves 309. Each of the grooves 309 extends in a direction S1 (indicated by a dotted line) oblique to a direction Z1 (indicated by an alternate long and two short dashes line) perpendicular to an extending direction X1 (indicated by an alternate long and short dash line) of the light guide 303.

Part of light that enters the light guide 303 from the light source 304 travels inside the light guide 303 toward the reflective surface 306 and is reflected off the reflective surface 306 by the plurality of grooves 309 provided in the reflective surface 306, resulting in being directed toward the exit surface 307 of the light guide 303.

This means that the plurality of grooves 309 provided in the reflective surface 306 are capable of reducing light leaking from the reflective surface 306. Furthermore, the light reflected off the reflective surface 306 by the grooves 309 can exit from the exit surface 307. With this, it is possible to provide the function of illumination.

The grooves 309 are each in a V shape, for example, when viewed from the direction Z1 (indicated by the alternate long and two short dashes line) perpendicular to the extending direction X1 (indicated by the alternate long and short dash line) of the light guide 303 in the first region 308. It is to be noted that the grooves 309 are not limited to the V shape and may each be in a U shape or other shapes. With the grooves 309 each in the U shape, the reflective surface 306 is capable of diffusing light to create an effect of dim light. Furthermore, the grooves 309 may be continuous without gaps.

Furthermore, the reflective surface 306 may include, in addition to the grooves 309, a reflective film (not illustrated) such as a metal-evaporated film and a metal tape. In this case, it is possible to further reduce light leaking from the reflective surface 306.

Figure 5:
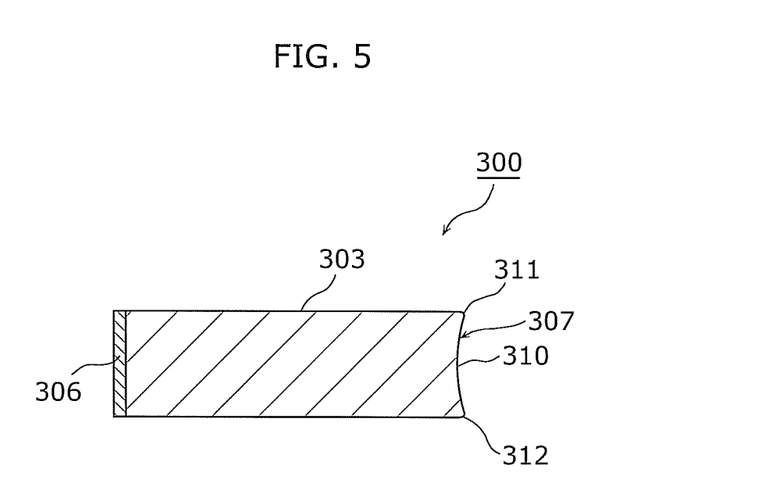
FIG. 5 is a cross-sectional view of the lighting device according to one example of the present invention taken along line A-A of FIG. 2.

FIG. 5 illustrates a cross-sectional view taken along line A-A of FIG. 2. Specifically, FIG. 5 is a cross-sectional view of the light guide 303 taken along a direction that is perpendicular to the extending direction X1 thereof. It is to be noted that FIG. 5 illustrates the reflective surface 306 by hatching lines to omit a structure thereof for convenience of illustration.

As illustrated in FIG. 5, the exit surface 307 includes a concave portion 310 which extends from the first end portion 301 toward the second end portion 305 of the light guide 303. In other words, the concave portion 310 is formed in the exit surface 307 of the light guide 303. The concave portion 310 is, for example, a curved surface of the exit surface 307 having an upper end 311 and a lower end 312 between which a mild indentation is formed toward the reflective surface 306.

Figure 6A:
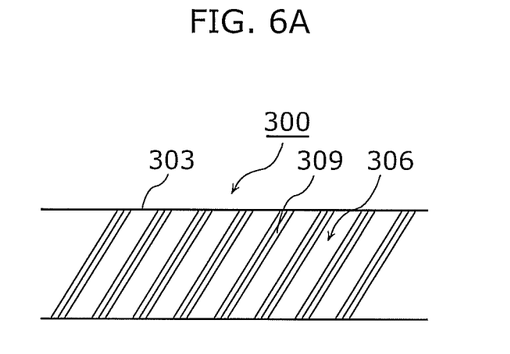
FIG. 6A is a closeup rear view of the lighting device according to one example of the present invention.

FIG. 6A illustrates a closeup rear view of the lighting device 300.

As illustrated in FIG. 6A, the plurality of grooves 309 provided in the reflective surface 306 of the light guide 303 appear inclined relative to the direction Z1 perpendicular to the extending direction X1 of the light guide 303 in the first region 308 when the lighting device 300 is viewed from the rear side (the reflective surface 306 side). Specifically, each of the grooves 309 is formed linearly along the direction from the upper right to the lower left (sloping upward to the right) in the drawing sheet of FIG. 6A. Furthermore, the plurality of grooves 309 are arranged in the extending direction of the light guide 303.

Figure 6B:
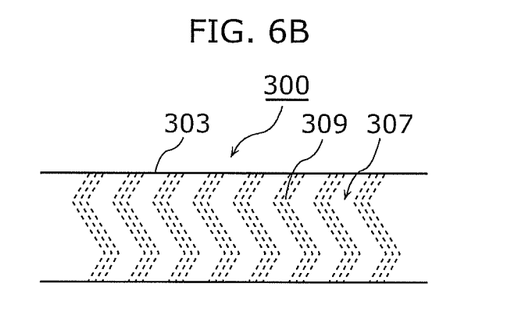
FIG. 6B is a closeup front view of the lighting device according to one example of the present invention.

FIG. 6B illustrates a closeup front view of the lighting device 300 viewed from the exit surface 307 side. Broken lines in FIG. 6B indicate the grooves 309 formed in the reflective surface 306 which are seen though the light guide 303. It is to be noted that the same applies to FIG. 4, FIG. 6C, FIG. 6D, and FIG. 7A as to broken lines in the drawings.

As illustrated in FIG. 6B, when the lighting device 300 is viewed from the front side (the exit surface 307 side), the grooves 309 appear in a different shape from the shape in which the grooves 309 appear when the lighting device 300 is viewed from the reflective surface 306 side. Specifically, in upper and lower areas of the exit surface 307, the grooves 309 that extend from the upper right toward the lower left are arranged in the extending direction of the light guide 303 while, in a middle area of the exit surface 307 therebetween, the grooves 309 that extend from the upper left toward the lower right are arranged in the extending direction of the light guide 303; and each of the grooves 309 seen in the upper, middle, and lower areas as a whole appears in the shape of a letter of "N" with respective parts of the groove 309 in the upper, middle, and lower areas connected.

Figure 6C:
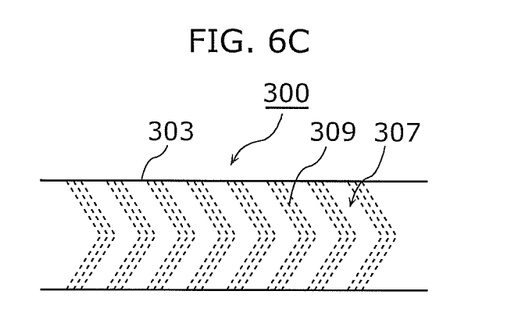
FIG. 6C is a closeup front view of the lighting device according to one example of the present invention viewed from above.

FIG. 6C illustrates a closeup front view of the lighting device 300 viewed from above. In FIG. 6C, the exit surface 307 of the lighting device 300 is viewed from slightly above the position thereof in FIG. 6B.

As illustrated in FIG. 6C, when the lighting device 300 is viewed from above on the front side (the exit surface 307 side), the grooves 309 appear in a different shape from both the shape in which the grooves 309 appear when the lighting device 300 is viewed from the reflective surface 306 side and the shape illustrated in FIG. 6B. Specifically, in the upper half of the light guide 303 in the drawing sheet of FIG. 6C, the grooves 309 that extend from the upper left toward the lower right appear arranged in the extending direction of the light guide 303. In the lower half of the light guide 303, the grooves 309 that extend from the lower left toward the upper right appear arranged in the extending direction of the light guide 303. Therefore, the shape of the grooves 309 seen in the upper half and in the lower half in FIG. 6C appears to be a symbol ">" with respective parts of the groove 309 in the upper half and in the lower half connected.

Figure 6D:
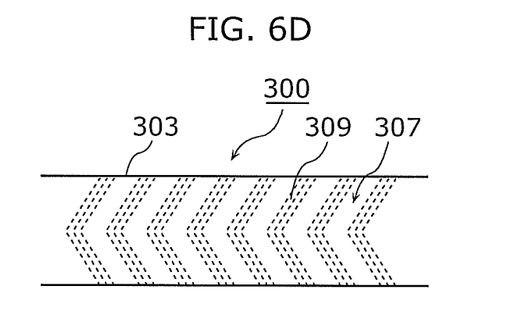
FIG. 6D is a closeup front view of the lighting device according to one example of the present invention viewed from below.

FIG. 6D illustrates a closeup front view of the lighting device 300 viewed from below. In FIG. 6D, the exit surface 307 of the lighting device 300 is viewed from slightly below the position thereof in FIG. 6B.

As illustrated in FIG. 6D, when the lighting device 300 is viewed from below on the front side (the exit surface 307 side), the grooves 309 appear in a different shape from both the shape in which the grooves 309 appear when the lighting device 300 is viewed from the reflective surface 306 side and the shapes illustrated in FIG. 6B and FIG. 6C. Specifically, in the upper half of the light guide 303 in the drawing sheet of FIG. 6D, the grooves 309 that extend from the upper right toward the lower left appear arranged in the extending direction of the light guide 303. In the lower half of the light guide 303, the grooves 309 that extend from the lower right toward the upper left appear arranged in the extending direction of the light guide 303. Therefore, each of the grooves 309 seen in the upper half and in the lower half in FIG. 6D as a whole appears in the shape of a symbol "<" with respective parts of the groove 309 in the upper half and in the lower half connected.

Figure 7A:
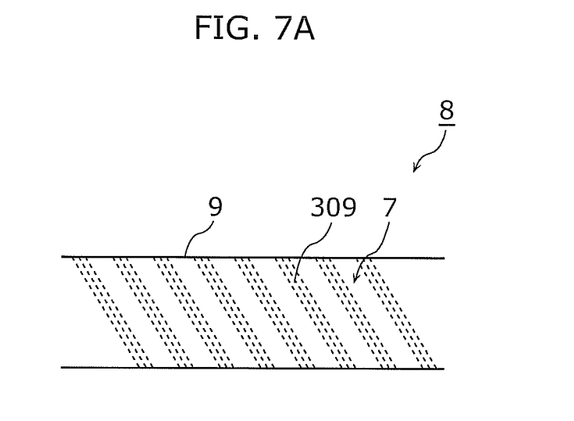
FIG. 7A is a closeup front view of a lighting device according to Comparative Example 1.

Here, FIG. 7A illustrates a closeup front view of a lighting device 8 according to Comparative Example 1 which has the same structure as that of the lighting device 300 except that an exit surface 7 is a flat surface parallel to the reflective surface 306.

As illustrated in FIG. 7A, in the lighting device 8 according to Comparative Example 1, when the lighting device 8 is viewed from the front side (the exit surface 7 side), the grooves 309 appear the same as those appeared when the lighting device 8 is viewed from the reflective surface 306 side. Specifically, the grooves 309 that extend from the upper left toward the lower right in the drawing of FIG. 7A appear arranged in an extending direction of a light guide 9. In other words, the grooves 309 in the lighting device 8 according to Comparative Example 1 appear in a shape obtained by horizontally reversing, with little change, the shape illustrated in FIG. 6A in which the grooves 309 appear when the lighting device is viewed from the reflective surface 306 side.

Here, the lighting device 300 according to this embodiment illustrated in FIG. 6B to FIG. 6D and the lighting device 8 according to Comparative Example 1 illustrated in FIG. 7A are compared. Both in the lighting device 300 and the lighting device 8, the reflective surface 306 includes the grooves 309, but the grooves 309 appear to have different shapes between when the lighting device 300 is viewed from the exit surface 307 and when the lighting device 8 is viewed from the exit surface 7 side.

This is because, in the case of the lighting device 300, the concave portion 310 formed in the exit surface 307 as illustrated in FIG. 5 refracts, among light reflected off the grooves 309 in the reflective surface 306, light reflected off the upper and lower surfaces of the light guide 303, with the result that the refracted light is directed toward the exit surface 307 in the lighting device 300.

The grooves 309 seen in the upper and lower areas of the exit surface 307 as illustrated in FIG. 6B are assumed to be the light reflected off the grooves 309 and then reflected off the upper and lower surfaces of the light guide 303. On the other hand, the grooves 309 seen in the middle area of the exit surface 307 are assumed to be light reflected off the grooves 309 and then transmitted through the light guide 303 without being reflected off the upper or lower surface of the light guide 303.

The grooves 309 seen in the lower half of the exit surface 307 as illustrated in FIG. 6C are assumed to be light reflected off the grooves 309 and then reflected off the lower surface of the light guide 303. On the other hand, the grooves 309 seen in the upper half of the exit surface 307 are assumed to be light reflected off the grooves 309 and then transmitted through the light guide 303 without being reflected by the upper or lower surface of the light guide 303.

The grooves 309 seen in the upper half of the exit surface 307 as illustrated in FIG. 6D are assumed to be light reflected off the grooves 309 and then reflected off the upper surface of the light guide 303. On the other hand, the grooves 309 seen in the lower half of the exit surface 307 are assumed to be light reflected off the grooves 309 and then transmitted through the light guide 303 without being reflected off the upper or lower surface of the light guide 303.

Thus, in the lighting device 300 in this embodiment illustrated in FIG. 6B to FIG. 6D, not only the light reflected off the grooves 309 and transmitted through the light guide 303 without being reflected off the upper or lower surface of the light guide 303, but also the light reflected off the grooves 309 and reflected off the upper and lower surfaces of the light guide 303, can be seen from the exit surface 307 side of the light guide 303. This is because the concave portion 310 formed in the exit surface 307 so as to extend from the first end portion 301 to the second end portion 305 of the light guide 303 refracts and collects light exiting from the exit surface 307 of the light guide 303.

In contrast, in the lighting device 8 according to Comparative Example 1 illustrated in FIG. 7A, the exit surface 7 of the light guide 9 is a flat surface parallel to the reflective surface 306, with the result that the light reflected off the grooves 309 fails to be refracted and collected when exiting from the exit surface 7 of the light guide 9.

Figure 7B:
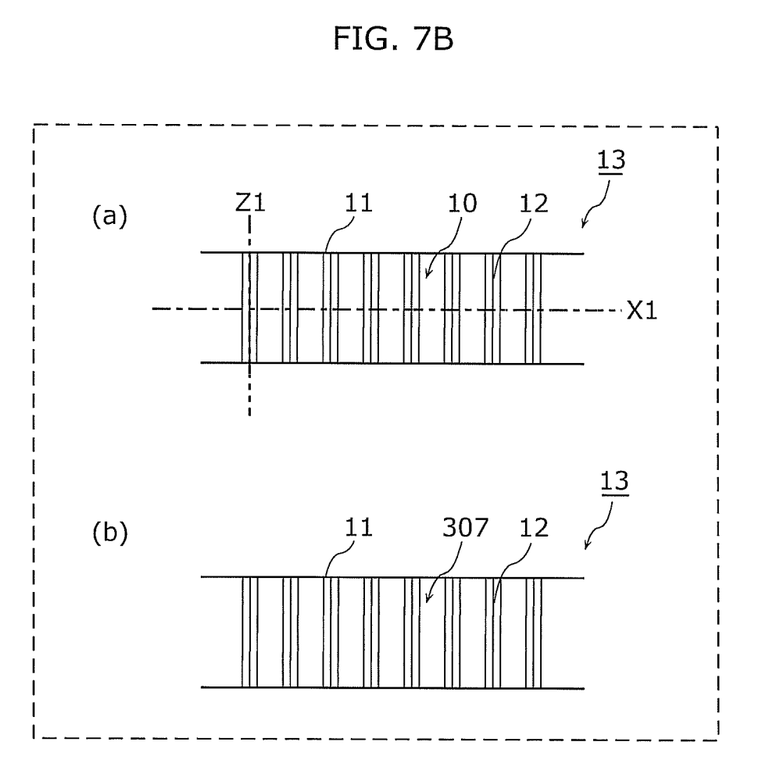
FIG. 7B illustrates a lighting device according to Comparative Example 2 in a closeup rear view in (a) and in a closeup front view in (b).

Next, FIG. 7B illustrates, in a closeup rear view in (a) and in a closeup front view in (b), a lighting device 13 according to Comparative Example 2 which has the same structure as that of the lighting device 300 except that a reflective surface 10 includes a plurality of grooves 12 extending in a direction Z1 (indicated by an alternate long and two short dashes line) perpendicular to an extending direction X1 (indicated by an alternate long and short dash line) of a light guide 11 in the first region 308 between the first end portion 301 and the second end portion 305.

As illustrated in FIG. 7B, the grooves 12 appear to have almost the same shape in the lighting device 13 according to Comparative Example 2 between when viewed from the reflective surface 10 side and when viewed from the exit surface 307 side. This means that even when the exit surface 307 includes the concave portion 310 extending from the first end portion 301 toward the second end portion 305, the reflective surface 10 that includes the plurality of grooves 12 extending in the direction Z1 (indicated by the alternate long and two short dashes line) perpendicular to the extending direction X1 (indicated by the alternate long and short dash line) of the light guide 11 in the first region 308 between the first end portion 301 and the second end portion 305 results in that the grooves 12 appear to have almost the same shape between when viewed from the reflective surface 10 side and when viewed from the exit surface 307 side. Thus, in the lighting device 13 according to Comparative Example 2, the grooves 12 formed in the lighting device 13 so as to provide the function of illumination appear in the shape merely as they are when viewed from the exit surface 307 side; therefore, it could hardly be said that the lighting device 13 has the function of decoration.

This is because, in the lighting device 13 according to Comparative Example 2, both light reflected off the grooves 12 and then reflected off the upper and lower surfaces of the light guide 11 and light reflected off the grooves 12 and then transmitted through the light guide 11 without being reflected off the upper or lower surface of the light guide 11 merely result in that, since the grooves 12 appear to have the same or like shape, almost the same shapes of the grooves 12 appear overlapping even when the light reflected off the reflective surface 10 is refracted and collected by the concave portion 310 of the exit surface 307.

As above, the lighting device 300 according to this embodiment includes: the light guide 303 which is elongated and has the first end portion 301 with the entrance surface 302; and the light source 304 provided facing the entrance surface 302 of the light guide 303, wherein the light guide 303 includes: the reflective surface 306 between the first end portion 301 and the second end portion 305 of the light guide 303; and the exit surface 307 opposite the reflective surface 306, the reflective surface 306 includes the plurality of grooves 309 which extend in the direction S1 oblique to the direction Z1 perpendicular to the extending direction X1 of the light guide 303 in the first region 308 between the first end portion 301 and the second end portion 305, and the exit surface 307 includes the concave portion 310 which extends from the first end portion 301 toward the second end portion 305. With this, it is possible to provide both the function of illumination and the function of decoration.

Furthermore, the lighting fitting 200 and the vehicle 100 according to this embodiment include the lighting device 300. With this, it is possible to provide both the function of illumination and the function of decoration.

Embodiment 2

Figure 8A:
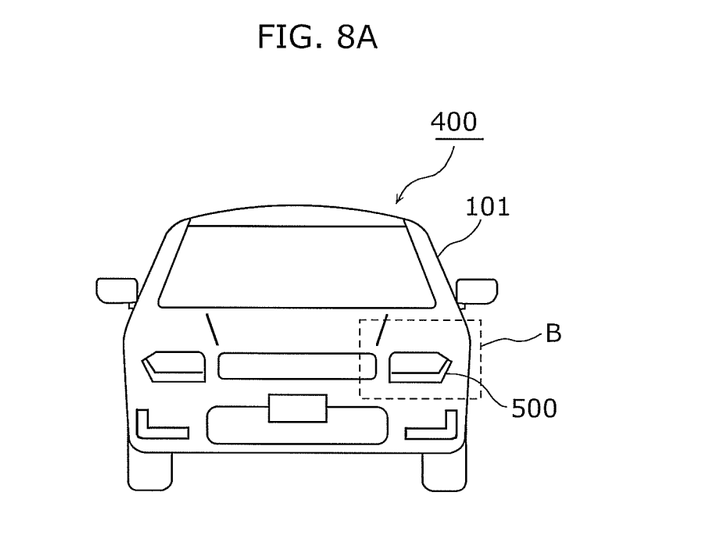
FIG. 8A is a front view of a vehicle according to one example of the present invention.
Figure 8B:
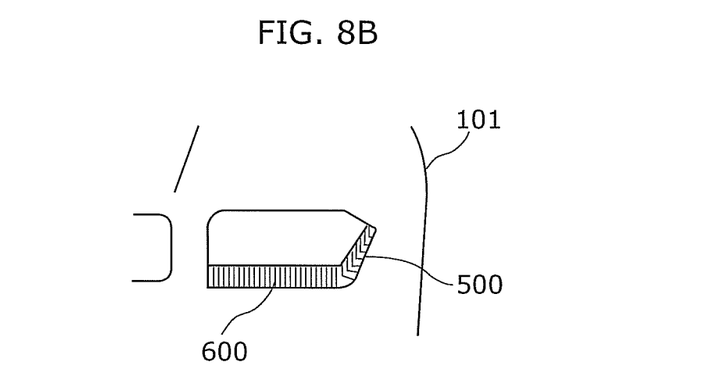
FIG. 8B is a closeup front view of the vehicle according to one example of the present invention.

FIG. 8A illustrates a front view of a vehicle according to one example of the present invention, and FIG. 8B illustrates a closeup front view of the vehicle. Here, FIG. 8B is a closeup view of a region B enclosed by broken lines in FIG. 8A.

A vehicle 400 according to Embodiment 2 of the present invention includes the vehicle body 101 and a lighting fitting 500 according to Embodiment 2 of the present invention as with the case of the vehicle 100.

Hereinafter, differences from the vehicle 100, the lighting fitting 200, and the lighting apparatus 300 according to Embodiment 1 are mainly described in Embodiment 2.

The lighting fitting 500 includes a housing (not illustrated) and a lighting device 600 placed in the housing which is a subject matter of Embodiment 2 of the present invention.

The lighting fitting 500 is, for example, each of front lamp units laterally arranged one on the left and one on the right in a front part of the vehicle body 101 and includes, in a housing, the lighting device 600, a front lamp (not illustrated), and a front turn signal lamp (not illustrated).

As illustrated in FIG. 8B, the lighting device 600 is, for example, provided at a lower edge of the lighting fitting 500 so as to form a rim of the lighting device 500. It is to be noted that the position of the lighting device 600 in the lighting fitting 500 is not limited to the lower edge and has various options. For example, the lighting device 600 may be one provided between the front lamp and the front turn signal lamp so that it can also be used as a partition.

Figure 9:
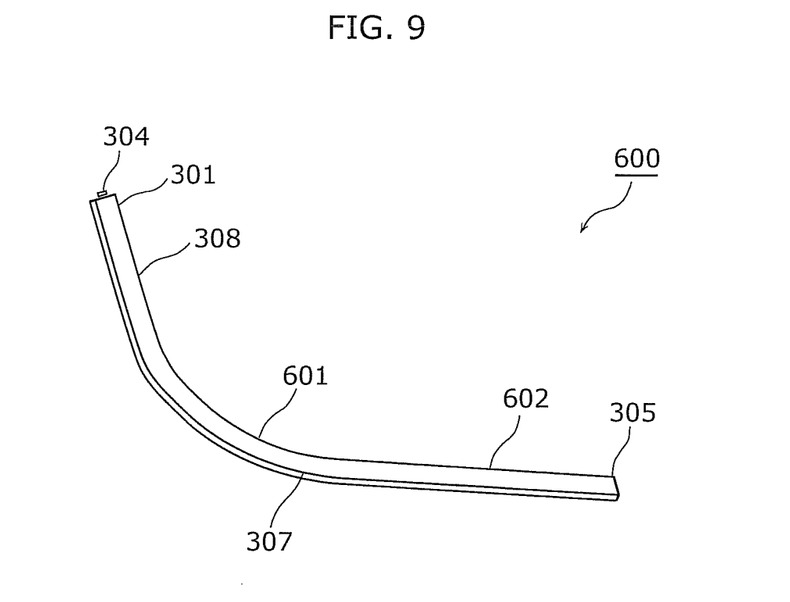
FIG. 9 is a perspective view of a lighting device according to one example of the present invention.

FIG. 9 illustrates a perspective view of the lighting device 600.

As illustrated in FIG. 9, the lighting device 600 includes a light guide 601 curved between the first end portion 301 and the second end portion 305 thereof. Because of being curved between the first end portion 301 and the second end portion 305, the light guide 601 is adaptable to a variety of shapes of lighting fittings.

It is to be noted that the light guide 601 may be curved at one point as illustrated in FIG. 9, or may be curved at a plurality of points, or may be gradually curved from the first end portion 301 toward the second end portion 305.

Figure 10:
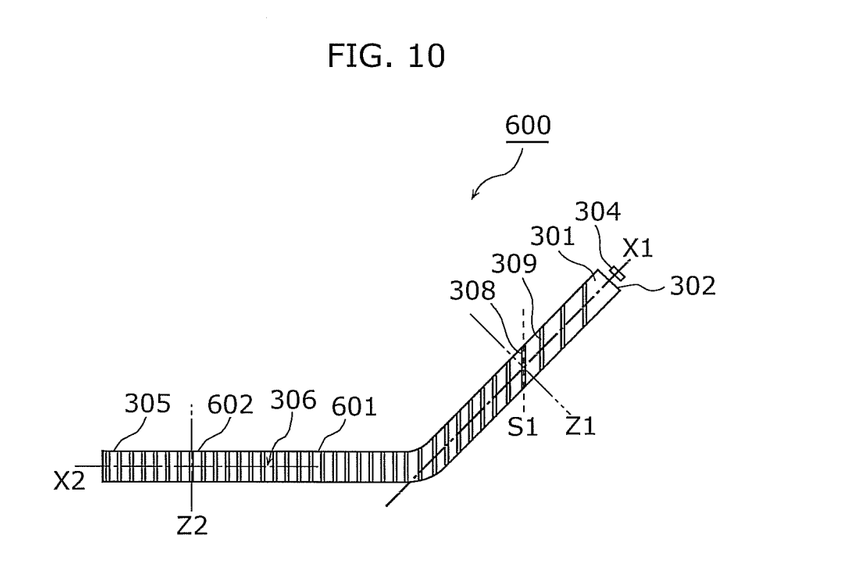
FIG. 10 is a rear view of the lighting device according to one example of the present invention.
Figure 11:
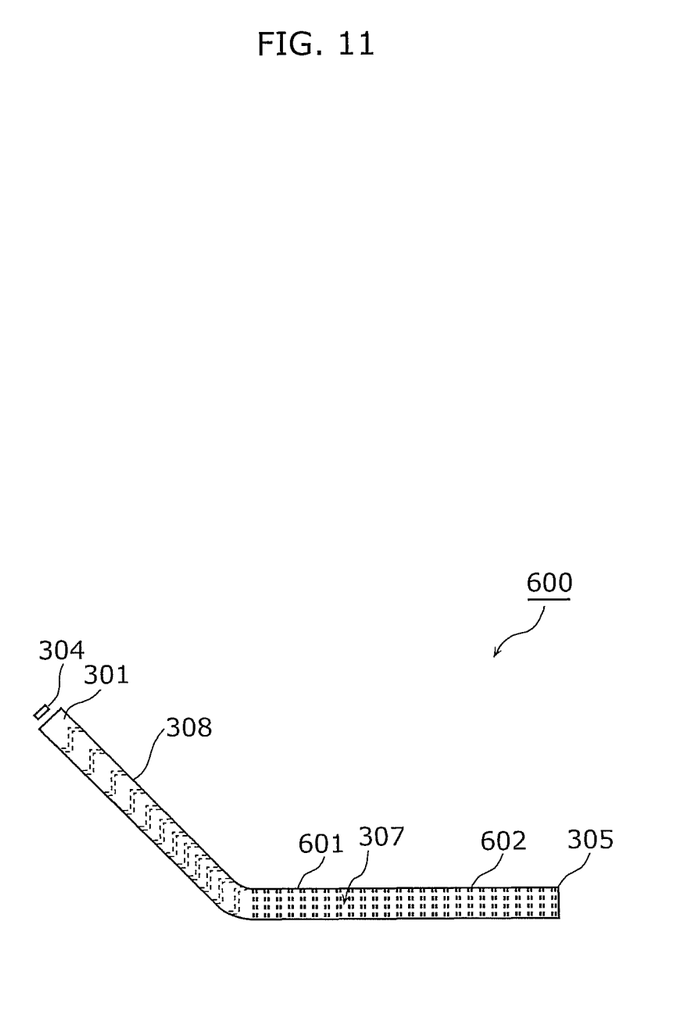
FIG. 11 is a front view of the lighting device according to one example of the present invention.

FIG. 10 illustrates a rear view of the lighting device 600, and FIG. 11 illustrates a front view of the lighting device 600. The lighting device 600 in FIG. 10 is viewed from the reflective surface 306 side, and the lighting device 600 in FIG. 11 is viewed from the exit surface 307 side.

As illustrated in FIG. 10, the reflective surface 306 in the first region 308 between the first end portion 301 and the second end portion 305 includes a plurality of grooves 309 which extend in a direction S1 (indicated by a dotted line) oblique to a direction Z1 (indicated by an alternate long and two short dashes line) perpendicular to an extending direction X1 (indicated by an alternate long and short dash line) of the light guide 601.

Specifically, the light guide 601 of the lighting device 600 is curved between the first end portion 301 and the second end portion 305 thereof in a direction parallel to the reflective surface 306. As a result, the grooves 309 seen from the exit surface 307 appear to have different shapes depending on the position in the extending direction of the light guide 601, allowing the lighting device 600 to have further improved decorativeness.

Furthermore, as illustrated in FIG. 10, the light guide 601 includes a second region 602 near the second end portion relative to the first region 308, and the grooves 309 extend in a direction Z2 perpendicular to an extending direction X2 in the second region 602.

Figure 12A:
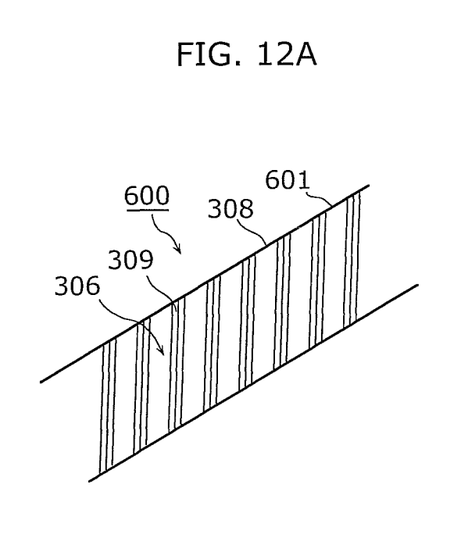
FIG. 12A is a closeup rear view of a first region in the lighting device according to one example of the present invention.
Figure 12B:
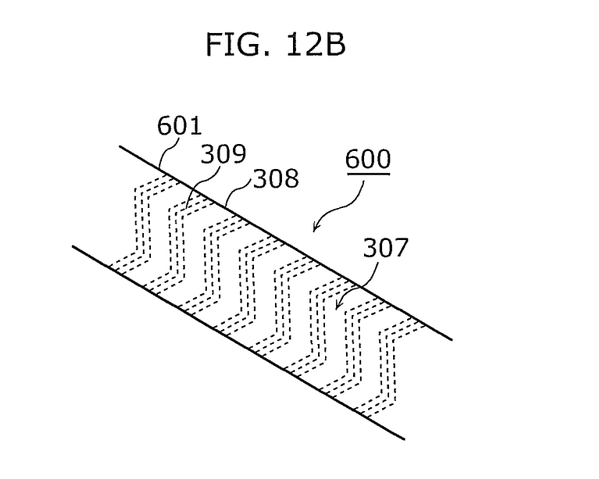
FIG. 12B is a closeup front view of the first region in the lighting device according to one example of the present invention.
Figure 12C:
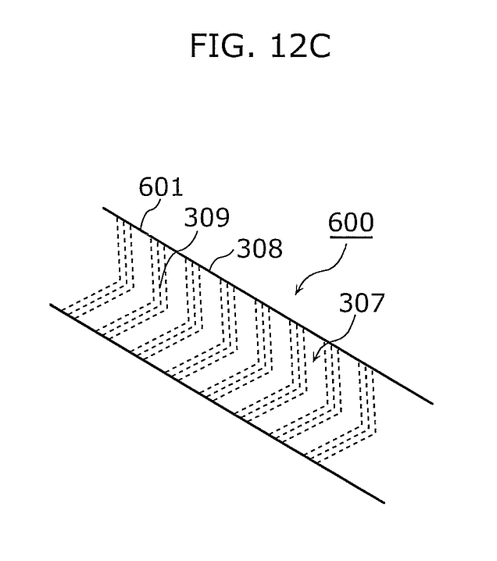
FIG. 12C is a closeup front view of the first region in the lighting device according to one example of the present invention viewed from above.
Figure 12D:
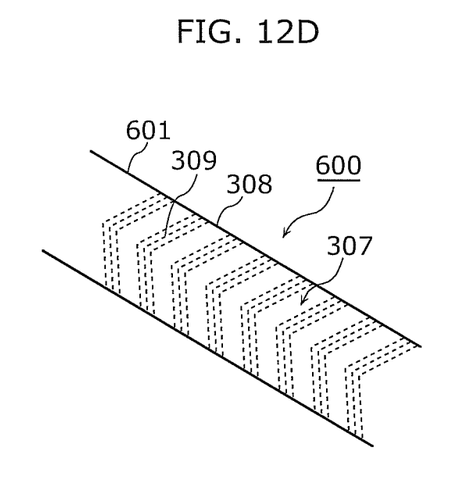
FIG. 12D is a closeup front view of the first region in the lighting device according to one example of the present invention viewed from below.

FIG. 12A illustrates a closeup rear view of the first region 308 of the lighting device 600, FIG. 12B illustrates a closeup front view of the first region 308, FIG. 12C illustrates a closeup front view of the first region 308 when the lighting device 600 is viewed from above, and FIG. 12D illustrates a closeup front view of the first region 308 when the lighting device 600 is viewed from below.

As illustrated in FIG. 12A to FIG. 12D, the grooves 309 appear to have different shapes in the first region 308 of the lighting device 600 between when viewed from the reflective surface 306 side and when viewed from the exit surface 307 side as in the case of the lighting device 300.

Figure 13A:
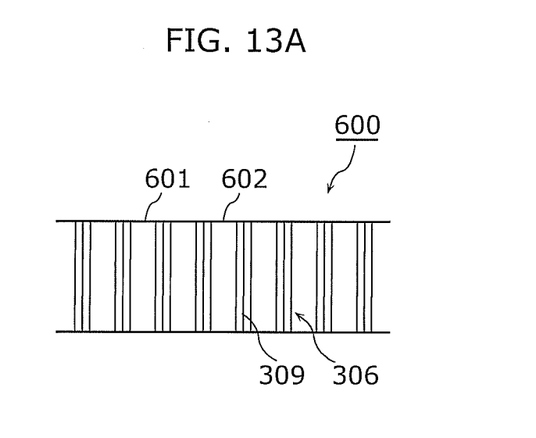
FIG. 13A is a closeup rear view of a second region in the lighting device according to one example of the present invention.
Figure 13B:
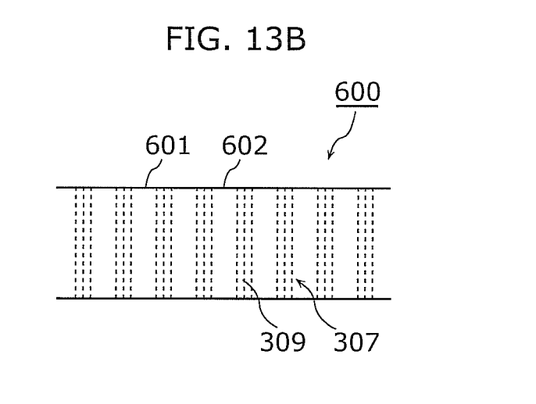
FIG. 13B is a closeup front view of the second region in the lighting device according to one example of the present invention.

FIG. 13A illustrates a closeup rear view of the second region 602 near the second end portion 305 relative to the first region 308, and FIG. 13B illustrates a closeup front view of that second region 602.

As illustrated in FIG. 13A and FIG. 13B, the grooves 309 provided in the reflective surface 306 appear to have almost the same shape in the second region 602 between when viewed from the reflective surface 306 side and when viewed from the exit surface 307 side.

This is because, in the second region 602 of the light guide 601, both light reflected off the grooves 309 and then reflected off the upper and lower surfaces of the light guide 601 and light reflected off the grooves 309 and then transmitted through the light guide 601 without being reflected off the upper or lower surface of the light guide 309 merely result in that, since the grooves 309 appear to have the same or like shape, almost the same shapes of the grooves 309 appear overlapping even when the light reflected off the reflective surface 306 is refracted and collected by the concave portion 310 of the exit surface 307. Thus, in the second region 602 of the light guide 601, the grooves 309 appear to have almost the same shape between when the lighting device 600 is viewed from the front, when the lighting device 600 is viewed from the upper front, and when the lighting device 600 is viewed from the lower front.

In other words, in the lighting device 600, the grooves 309 appear to have different shapes between the exit surface 307 of the light guide 601 in the first region 308 and the exit surface 307 of the light guide 601 in the second region 602. Especially, since the grooves 309 extend in the direction Z2 perpendicular to the extending direction X2 in the second region 602, the lighting device 600 has both the function of illumination and the function of decoration in the first region 308 and mainly has the function of decoration in the second region 602.

As above, in the lighting device 600 according to Embodiment 2 of the present invention, the light guide 601 is curved between the first end portion 301 and the second end portion 305 thereof. This provides adaptability to more varieties of shapes of lighting fittings than in the case of the lighting device 300.

Furthermore, the lighting device 600 is curved between the first end portion 301 and the second end portion 305 thereof in the direction parallel to the reflective surface 306. This makes it possible to provide further improved decorativeness than in the case of the lighting device 300.

Furthermore, in the lighting device 600, the light guide 601 includes: the first region 308; and the second region 602 near the second end portion 305 relative to the first region 308, and the grooves 309 extend in the direction Z2 perpendicular to the extending direction X2 in the second region 602. With this, it is possible to provide a lighting device which has both the function of illumination and the function of decoration in the first region 308 and mainly has the function of illumination in the second region 602.

Furthermore, the lighting fitting 500 and the vehicle 400 according to Embodiment 2 of the present invention include the lighting device 600, thereby being capable of exerting the above-stated effect.

(Variations)

Although the lighting device, the lighting fitting, the vehicle, and so on have herein been described based on embodiments of the present invention, but the present invention is not limited to the above embodiments; for example, the following variations are possible.

1. Regarding Vehicles

The vehicles 100 and 400 are not limited to four-wheeled vehicles and may be two-wheeled vehicles or three-wheeled vehicles.

2. Regarding Lighting Fittings

The lighting fittings 200 and 400 are not limited to DRLs and front lamp units and may be turn lamps or the like.

3. Regarding Lighting Devices

The entrance surface 302 of each of the light guides 303 and 601 is not limited to a flat surface and may be a concave surface or a convex surface in terms of shape. Furthermore, the entrance surface 302 may have a lens function. In this case, the lighting device can be smaller in size than in the case of providing a separate lens in the light source 304.

Furthermore, the reflective surface 306 of each of the light guides 303 and 601 may include the grooves 309 the shapes of which are more than one type.

The concave portion 310 of the exit surface 307 of each of the light guides 303 and 601 is designed herein to be a curved surface which is gently recessed toward the reflective surface 306 by, for example, forming an indentation between the upper end 311 and the lower end 312 of the exit surface 307, but this is not the only example. For example, the concave portion 310 may be a curved surface which is recessed between the upper end 311 and the lower end 312 by protruding the upper end 311 and the lower end 312.

Furthermore, the grooves 309 of each of the light guides 303 and 601 may have a smaller pitch near the second end portion 305 than near the first end portion 301 as illustrated in FIG. 10 and FIG. 11, for example. In other words, the grooves 309 of each of the light guides 303 and 601 may be sparse (at wide intervals) near the first end portion 301 and be dense (at narrow intervals) near the second end portion 305 as illustrated in FIG. 10 and FIG. 11. Furthermore, in this case, in order to reduce unevenness in light brightness which is due to the grooves 309 being different in pitch, i.e., whether at wide or narrow intervals, the light guides 303 and 601 may, in particular, include a curved portion which is curved between the first end portion 301 side and the second end portion 305 side as illustrated in FIG. 10 and FIG. 11. This means that, on the first end portion 301 side on this curved portion, the grooves 309 may be switched from the wide intervals to the narrow intervals, that is, from sparse to dense.

The grooves 309 of each of the light guides 303 and 601 may have a smaller pitch near the second end portion 305 than near the first end portion 301. In this case, light guided through the light guides 303 and 601 can be more easily reflected toward the exit surface 307 off the reflective surface 306 of the light guides 303 and 601 near the second end portion 305 than near the first end portion 301. With this, it is possible to facilitate light emission from the exit surface 307 on the second end portion 305 side in which light is weak because of a long distance from the light source 304. Therefore, the brightness unevenness of light emitted from the exit surface 307 of each of the light guides 303 and 601 can be reduced.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device comprising:
a light guide which is elongated and has a first end portion with an entrance surface; and
a light source provided facing the entrance surface of the light guide,
wherein the light guide includes: a reflective surface between the first end portion and a second end portion of the light guide; and an exit surface opposite the reflective surface,
the reflective surface includes a plurality of grooves which extend in a direction oblique to a direction perpendicular to an extending direction of the light guide in a first region between the first end portion and the second end portion, and
the exit surface includes a concave portion which is recessed toward the reflective surface in a cross-sectional view, and the concave portion extends from the first end portion toward the second end portion.

2. The lighting device according to claim 1,
wherein the light guide is curved between the first end portion and the second end portion.

3. The lighting device according to claim 2,
wherein the light guide is curved between the first end portion and the second end portion in a direction parallel to the reflective surface.

4. The lighting device according to claim 1,
wherein the light guide includes: the first region; and a second region near the second end portion relative to the first region, and
the plurality of grooves are provided extending in a direction perpendicular to an extending direction of the light guide in the second region.

5. The lighting device according to claim 1,
wherein the plurality of grooves have a smaller pitch near the second end portion than near the first end portion.

6. A lighting fitting comprising:
the lighting device according to claim 1; and
a housing in which the lighting device is placed.

7. A vehicle comprising:
the lighting device according to claim 1; and
a vehicle body.

* * * * *